United States Patent
Priebe et al.

(10) Patent No.: US 11,476,662 B2
(45) Date of Patent: Oct. 18, 2022

(54) STAR POINT GROUNDING WITH OVERVOLTAGE LIMITATION FOR A POLYPHASE TRANSFORMER

(71) Applicant: SIEMENS ENERGY GLOBAL GMBH & CO. KG, Munich (DE)

(72) Inventors: Torsten Priebe, Moehrendorf (DE); Christian Schacherer, Deining (DE); Roland Schuster, Erlangen (DE)

(73) Assignee: Siemens Energy Global GmbH & Co. KG, Munich (DE)

( * ) Notice: Subject to any disclaimer, the term of this patent is extended or adjusted under 35 U.S.C. 154(b) by 0 days.

(21) Appl. No.: 17/280,977

(22) PCT Filed: Sep. 27, 2018

(86) PCT No.: PCT/EP2018/076320
§ 371 (c)(1),
(2) Date: Mar. 29, 2021

(87) PCT Pub. No.: WO2020/064112
PCT Pub. Date: Apr. 2, 2020

(65) Prior Publication Data
US 2021/0313799 A1   Oct. 7, 2021

(51) Int. Cl.
*H02H 9/04* (2006.01)
*H01F 27/28* (2006.01)

(52) U.S. Cl.
CPC ............... *H02H 9/04* (2013.01); *H01F 27/28* (2013.01)

(58) Field of Classification Search
CPC ................................. H02H 9/04; H01F 27/28
(Continued)

(56) References Cited

U.S. PATENT DOCUMENTS

| 5,654,857 A * | 8/1997 | Gershen | .............. | H02H 3/33 |
| | | | | 361/45 |
| 7,082,022 B2 * | 7/2006 | Bishop | .............. | H02H 9/06 |
| | | | | 361/119 |

(Continued)

FOREIGN PATENT DOCUMENTS

| CN | 2907023 Y | 5/2007 |
| CN | 202474853 U | 10/2012 |

(Continued)

OTHER PUBLICATIONS

Jose Nunes; Title: A method and a device for overvoltage protection and an electric system with such a device; publication date: Mar. 3, 2011; Figures, abstract, and specification (Year: 2011).*

(Continued)

*Primary Examiner* — Dharti H Patel
(74) *Attorney, Agent, or Firm* — Laurence A. Greenberg; Werner H. Stemer; Ralph E. Locher

(57) ABSTRACT

An arrangement contains a polyphase transformer which has primary windings and secondary windings. The secondary windings are connected to form a star circuit, the star point of which is connected to earth potential by means of an overvoltage-limiting device. The overvoltage-limiting device has a first overvoltage-limiting component. A switch, which electrically bridges the first overvoltage-limiting component in its closed state, is assigned to the first overvoltage-limiting component.

15 Claims, 5 Drawing Sheets

(58) Field of Classification Search
USPC .................................................... 361/91.1
See application file for complete search history.

(56) References Cited

U.S. PATENT DOCUMENTS

| | | | | |
|---|---|---|---|---|
| 8,493,754 | B1* | 7/2013 | Wambsganss | H02M 1/4216 |
| | | | | 363/90 |
| 2003/0151862 | A1* | 8/2003 | Kouwenhoven | H02H 9/06 |
| | | | | 361/35 |
| 2005/0068709 | A1* | 3/2005 | Kouwenhoven | H02H 9/06 |
| | | | | 361/118 |
| 2016/0149396 | A1* | 5/2016 | Lindell | H02H 9/04 |
| | | | | 361/35 |

FOREIGN PATENT DOCUMENTS

| | | | |
|---|---|---|---|
| CN | 104319733 | A | 1/2015 |
| EP | 0860927 | A1 | 8/1998 |
| EP | 2474086 | B1 | 4/2016 |
| EP | 2722861 | B1 | 7/2016 |

OTHER PUBLICATIONS

Jose Nunes; Title: method for protecting transformers and a transformer; publication date: Dec. 29, 2010 (Year: 2010).*
Authors —Undisclosed: ,,Betriebserdung, Betriebserdung, XP055598902, Internet, Found in Internet: URL:https://de.wikipedia.org/w/index.php?title=Betriebserdung&action=history; [gefunden am Jun. 24, 2019], the whole document; 2018.

* cited by examiner

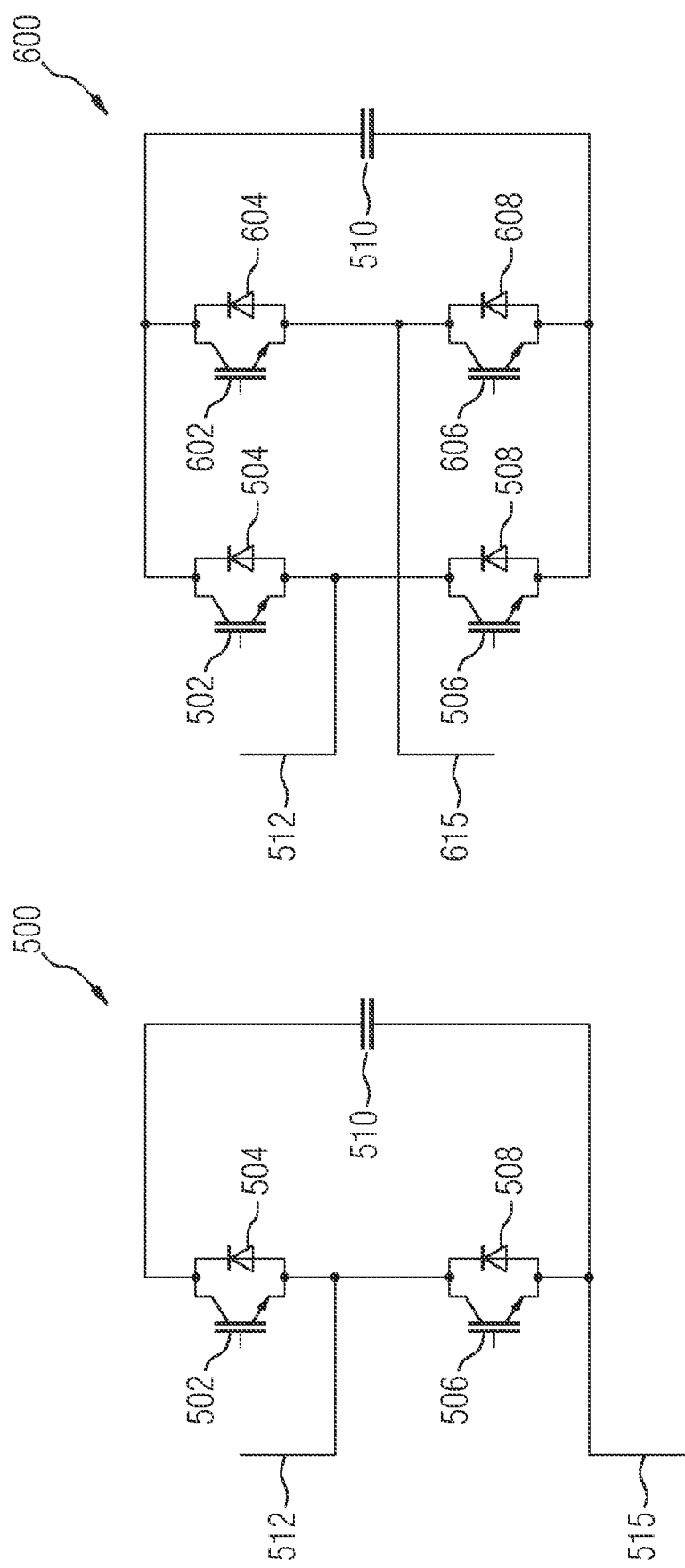

STAR POINT GROUNDING WITH OVERVOLTAGE LIMITATION FOR A POLYPHASE TRANSFORMER

BACKGROUND OF THE INVENTION

Field of the Invention

The invention relates to an arrangement having a polyphase transformer, which has primary windings and secondary windings, wherein the secondary windings are connected in a star circuit. The invention further relates to a method for protecting an electrical system from overvoltage.

An arrangement of the type described above can be found in many electrical systems, in particular even in high-voltage systems. Here, the primary windings of the transformer are often able to be connected to an AC voltage grid, which supplies electrical energy to the arrangement and hence to the entire system or which is supplied with energy by the arrangement. An electrical device, for example a power converter, is generally connected to the secondary windings of the transformer.

During operation of the arrangement or the system, faults can occur upon which the electrical potential of the star point of the secondary windings assumes undesirably high values. The secondary voltages of the transformer then also assume undesirably high values, which can lead to damage of the transformer but also, in particular, to damage of the electrical device that is connected to the secondary windings of the transformer.

SUMMARY OF THE INVENTION

The invention is based on the object of specifying an arrangement and a method by way of which electrical potentials on the secondary windings of the transformer that occur in the event of a fault can be limited.

This object is achieved according to the invention by an arrangement and by a method as claimed in the independent patent claims. Advantageous configurations of the arrangement and the method are given in the dependent patent claims.

An arrangement having a polyphase transformer, which has primary windings and secondary windings, is disclosed, wherein the secondary windings are connected in a star circuit, the star point of which is connected to ground potential by means of an overvoltage limitation device, the overvoltage limitation device has a first overvoltage-limiting component, and a switch, which in its closed state electrically bypasses the first overvoltage-limiting component, is assigned to the first overvoltage-limiting component.

In this case, the arrangement may be an electrical system or part of an electrical system, in particular a high-voltage electrical system. In the case of said arrangement, it is particularly advantageous that the switch can be closed in the event of a fault, and therefore the electrical overvoltage-limiting component can be bypassed. In this case, the switch acts as a bypass, which moves the ground potential to the terminal of the first overvoltage-limiting component (the terminal being directed away from the ground potential). As a result, the electrical potential of the star point is moved closer to the ground potential; the electrical potential of the star point can even be set to ground potential. As a result, in the event of a fault, the secondary voltages of the transformer are reduced (in particular the maximum values of the secondary voltages of the transformer are limited). As a result, overvoltage-induced damage to the transformer and/or to the electrical device that is connected to the transformer is prevented. The transformer and the connected device can be configured for lower maximum values of the voltage, which saves on outlay and costs. The switch can also be referred to as a short-circuiting device because it serves to short-circuit the first overvoltage-limiting component when required. Alternatively, the switch could also be referred to as an (in particular rapid) ground connection.

The arrangement can be configured in such a way that the switch is connected in parallel with the first overvoltage-limiting component. As a result, the first overvoltage-limiting component can be bypassed by means of the switch.

The arrangement can also be configured in such a way that the overvoltage limitation device has a second overvoltage-limiting component, which is electrically connected in series with the first overvoltage-limiting component. The second overvoltage-limiting component is thereby advantageously an overvoltage-limiting component that is not bypassed by the electrical switch even in the event of a fault. As a result, said second overvoltage-limiting component remains active even in the event of a fault, which significantly increases the number of layout options when designing the arrangement.

The arrangement can be configured in such a way that the second overvoltage-limiting component is switchless. A switchless component is understood here to mean a component to which no switch is assigned. In other words, the switchless second overvoltage-limiting component is not bypassed by an electrical switch (even in the event of fault). Said switchless second overvoltage-limiting component is thus always electrically active in the arrangement independently of the state of the switch. The second overvoltage-limiting component can thus be referred to as a switchless component.

The arrangement can also be configured in such a way that the first overvoltage-limiting component and/or the second overvoltage-limiting component is a surge arrester. By means of the surge arrester or surge arresters, it is advantageously possible to achieve additional overvoltage protection that is effective independently of the switch. Even if the switch malfunctions (for example if the switch cannot be closed even in the event of a fault), the overvoltage-limiting component or the overvoltage-limiting components are active in the arrangement and prevent the star point of the secondary windings exceeding a preselected maximum value. Said maximum value is determined by the characteristic values of the surge arresters.

The arrangement can be configured in such a way that the switch is a mechanical switch. Said mechanical switch can have, in particular, a vacuum interrupter. A mechanical switch can be achieved in a cost-effective manner. Mechanical switches that close very rapidly are also available on the market. It is therefore possible to achieve rapid protection of the arrangement from overvoltage.

The arrangement can also be configured in such a way that the switch is a power electronics switch, in particular a power electronics switch having thyristors that are connected in antiparallel. It is possible to achieve particularly rapid closing times of the switch by means of the power electronics switch, in particular a power electronics switch based on a thyristor.

The arrangement can also be configured in such a way that the switch has a (triggerable) gas insulation section. Gas insulation sections of this kind are also referred to as gas spark gaps. Said gas insulation sections can be triggered, that is to say can be set to a conductive state. The insulating gas used here may be, for example, SF6 or comparable, more environmentally friendly substitute gases.

The arrangement can be configured in such a way that the switch is connected to a tripping apparatus, wherein the tripping apparatus is configured in such a way that it closes the switch when a fault occurs on the secondary side of the transformer, in particular when a fault occurs in a power converter that is connected to the secondary side of the transformer. As a result, the arrangement and in particular also the power converter are protected from overvoltage in the event of a fault; the overvoltage is at least limited. In this case, the fault may be, in particular, a ground fault on a phase line that is connected to one of the secondary windings of the transformer.

The arrangement can also be configured in such a way that the transformer is configured for a secondary voltage≥36 kV. In other words, the transformer can be configured (in particular with respect to the electrical insulation properties) in such a way that the transformer is able to be operated with a secondary voltage≥36 kV. The described switch is particularly advantageous when the transformer has a secondary voltage≥36 kV, that is to say when it is a high-voltage transformer or a high-voltage arrangement. In this case, the elements of the high-voltage arrangement or the high-voltage system can be protected from overvoltage by means of the switch in a comparatively simple and reliable manner even in the event of a fault.

A method for protecting an electrical system from overvoltage is also disclosed, wherein the electrical system has a polyphase transformer having primary windings and secondary windings, the secondary windings are connected in a star circuit, the star point of which is connected to ground potential by means of an overvoltage limitation device, the overvoltage limitation device has a first overvoltage-limiting component, and a switch, which in its closed state electrically bypasses the first overvoltage-limiting component, is assigned to the first overvoltage-limiting component and, wherein in the method the switch is closed when a fault occurs on the secondary side of the transformer, in particular when a fault occurs in a power converter that is connected to the secondary side of the transformer.

As a result, an increase in the voltage of the star point caused by the fault is limited.

The method can also proceed in such a way that the fault is a ground connection on a phase line that is connected to one of the secondary windings of the transformer.

The arrangement and the method have identical or similar advantages.

In the text which follows, the invention will be explained in more detail with reference to exemplary embodiments. Identical reference signs in this case relate to identical or functionally identical elements.

BRIEF DESCRIPTION OF THE SEVERAL VIEWS OF THE DRAWING

FIG. 5 illustrates an exemplary embodiment of a module of the modular multilevel power converter, and FIG. 6 illustrates a further exemplary embodiment of a module of the modular multilevel power converter.

DETAILED DESCRIPTION OF THE INVENTION

Figure 1:
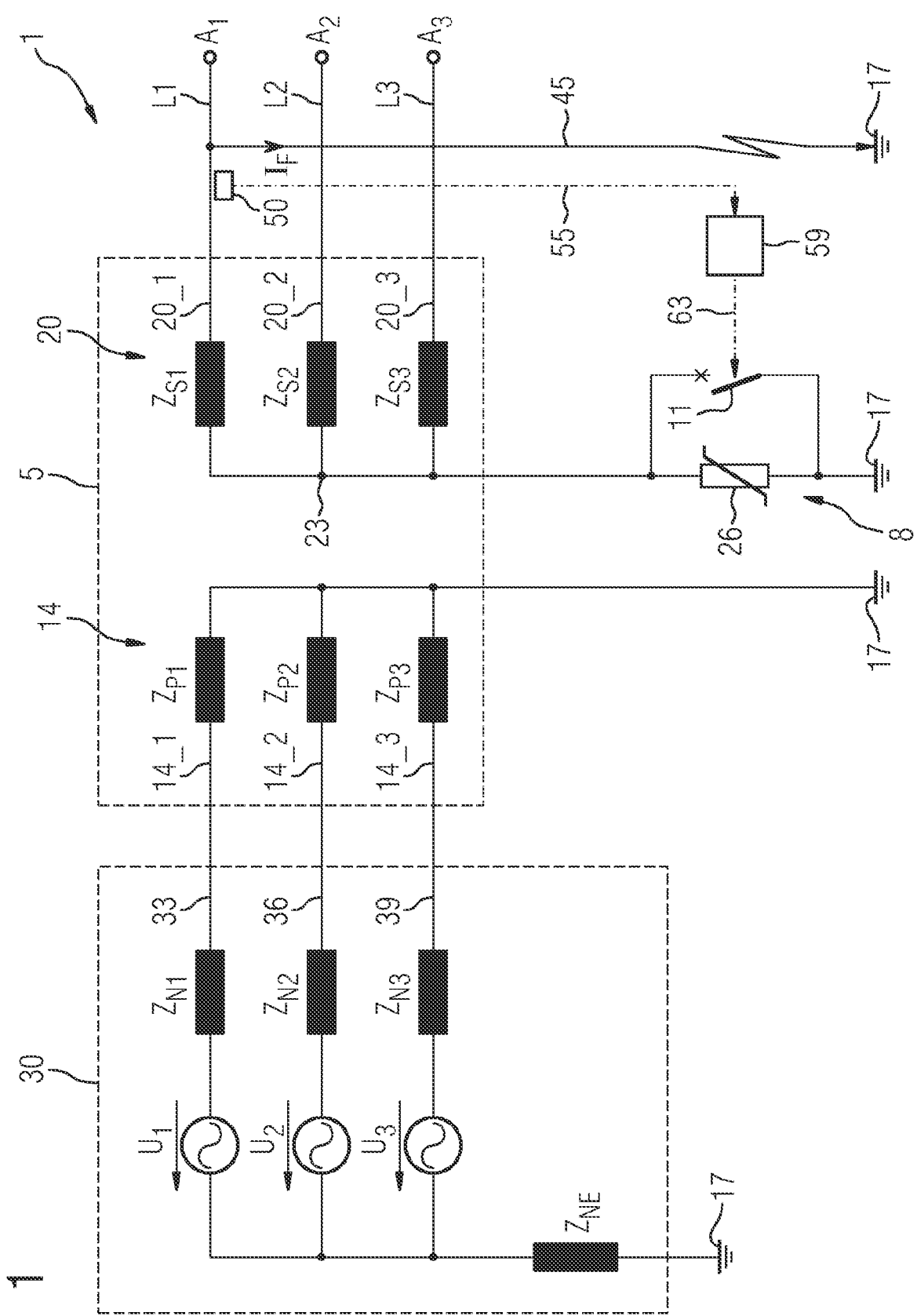
FIG. 1 illustrates an exemplary embodiment of an arrangement having a polyphase transformer and a first overvoltage-limiting component.

FIG. 1 illustrates an arrangement 1 having a polyphase transformer 5, an overvoltage limitation device 8 and a switch 11. The transformer 5 has a first primary winding 14_1, a second primary winding 14_2 and a third primary winding 14_3. The three primary windings 14_1, 14_2 and 14_3 are illustrated in an exemplary manner as a first primary winding impedance $Z_{P1}$, a second primary winding impedance $Z_{P2}$ and a third primary winding impedance $Z_{P3}$, respectively. The three primary windings 14_1, 14_2 and 14_3 are connected in a star circuit; the star point of the star circuit is connected to ground potential 17.

The transformer 5 furthermore has a first secondary winding 20_1, a second secondary winding 20_2 and a third secondary winding 20_3. These three secondary windings 20_1, 20_2 and 20_3 are illustrated in an exemplary manner by their respective secondary winding impedances $Z_{S1}$, $Z_{S2}$ and $Z_{S3}$. The three secondary windings 20 are connected in a star circuit; the star point 23 of this star circuit is connected to ground potential 17 via the overvoltage limitation device 8. The star circuit can also be achieved by an additional star point reactor outside of the transformer 5.

In the exemplary embodiment of FIG. 1, the overvoltage limitation device 8 has a first overvoltage-limiting component 26. This first overvoltage-limiting component 26 is configured as a first surge arrester 26. The switch 11 is connected in parallel with the first overvoltage-limiting component 26. In its closed state, the switch 11 bypasses the overvoltage limitation device 8. More specifically, in its closed state, the switch 11 bypasses the first overvoltage-limiting component 26 of the overvoltage limitation device 8. When the first switch 11 is closed, the first overvoltage-limiting component 26 and therefore the overvoltage limitation device 8 are thus bypassed (short-circuited), with the result that the star point 23 is connected directly to ground potential 17. When the switch 11 is open, the overvoltage limitation device 8 is electrically active, with the result that (during operation of the arrangement) an electrical potential that may differ from the ground potential 17 is present at the star point 23.

The primary windings 14 of the transformer 5 are able to be connected to a polyphase AC voltage grid 30. The AC voltage grid 30 has three phases, which are each illustrated in an exemplary manner by an ideal AC voltage source U and a grid impedance $Z_N$ (grid phase impedance $Z_N$). For example, a first phase 33 of the three-phase AC voltage grid 30 thus has a first ideal voltage source $U_1$ and a first grid impedance $Z_{N1}$. A second phase 36 and a third phase 39 of the AC voltage grid 30 are of similar structure. The three phases 33, 36 and 39 of the AC voltage grid 30 are connected in a star circuit. The star point of the star circuit is connected to ground potential 17, wherein the ground impedance is illustrated in an exemplary manner as component $Z_{NE}$.

The first secondary winding 20_1 is electrically connected to a first terminal $A_1$. In this case, the end of the first secondary windings 20_1 that is opposite the star point 23 is connected to the first terminal $A_1$ via a first phase line $L_1$. In a similar way, the second secondary winding 20_2 is connected to a second terminal $A_2$ by means of a second phase line $L_2$. The third secondary winding 20_3 is connected to a third terminal $A_3$ via a third phase line $L_3$. One or more further electrical devices (of a system), for example a power converter, can be connected to the terminals $A_1$ to $A_3$. In the exemplary embodiment, a multilevel power converter is connected to the terminals $A_1$ to $A_3$, as is described in detail in connection with FIGS. 4 to 6. However, in other exemplary embodiments, other electrical devices can also be connected to the terminals $A_1$ to $A_3$, for example different types of power converter.

In the exemplary embodiment, a three-phase AC voltage circuit breaker (not illustrated in the figures) is optionally arranged between the AC voltage grid 30 and the transformer 5. During normal operation of the arrangement 1, the AC voltage circuit breaker is closed (switched on); the transformer 5 is thus electrically connected to the AC voltage grid 30. The secondary windings 20 then supply electrical energy to the multilevel power converter that is connected to the terminals $A_1$ to $A_3$. The multilevel power converter can, for example, rectify the AC voltage provided by the secondary windings 20 and provide a DC voltage or a direct current at its output. The multilevel power converter, fed from a DC voltage, can provide an AC voltage or an alternating current in the opposite energy direction. Such a configuration is used, for example, in high-voltage DC transmission. However, the multilevel power converter can also have only AC voltage terminals, which are connected to the terminals $A_1$ to $A_3$. In this case, the multilevel power converter can operate, for example, as a reactive power capacitor or similar, in particular in what are known as FACTS systems.

In normal operation, the switch 11 is open, with the result that the overvoltage limitation device 8 is electrically active. Since there is no overvoltage at the star point 23 in normal operation, the overvoltage limitation device 8 (in this case: the first surge arrester 26) has a high impedance, with the result that the overvoltage limitation device 8 does not significantly influence the electrical potential of the star point 23.

It will now be assumed that a fault occurs in the arrangement 1: on the first phase line $L_1$, a ground fault 45 (single-pole ground fault 45) occurs between the transformer 5 and the connected power converter, as a result of which a fault current $I_F$ begins to flow from the first phase line $L_1$ to the ground potential 17. (In another exemplary embodiment, the fault can also occur at another location of the first phase on the secondary side of the transformer 5, for example at an electrical connection between the first terminal $A_1$ and the power converter or within the power converter. The fault can of course also occur on another phase).

In the case of such a fault 45, the multilevel power converter that is connected to the terminals $A_1$ to $A_3$ would usually be disconnected (that is to say the electronic switching elements of the modules of the multilevel power converter would be set to an off state). The AC voltage circuit breaker between the AC voltage grid 30 and the transformer 5 would also be opened. However, since AC voltage circuit breakers usually open relatively slowly (that is to say they require, for example, 50 to 100 milliseconds to actually interrupt the flow of current), energy continues to flow from the AC voltage grid 30 via the transformer 5 into the power converter for a significant period of time. As a result, the power converter is charged to undesirably high voltages by the AC voltage grid 30. This undesirably high charging of the power converter on the AC voltage side can be amplified further by an overvoltage that may occur in the AC voltage grid 30 (which arises on account of the fault or on account of load shedding caused by the fault). The maximum voltage arising in the power converter in the case of such a fault previously had to be taken into account in the designing of the power converter and led to, for example, the multilevel power converter having to have a comparatively high number of modules in order for the individual modules to not be overloaded in the case of overvoltage. Considerable costs arose on account of the relatively high number of modules required. This oversizing of the power converter in particular is avoided according to the invention, as is explained in the following text.

In the exemplary embodiment of FIG. 1, the occurrence of the fault 45 is identified, for example by means of current measurement carried out on the first phase line $L_1$. Current measurement of this type can be carried out, for example, by means of a measurement transducer 50, which is arranged on the first phase line $L_1$. A (rapidly operating) zero flux measurement transducer can preferably be used, as a result of which the altered current ratios on the first phase line $L_1$ can be identified very quickly. Current measurement values 55 are transmitted from the measurement transducer 50 to a tripping apparatus 59. The tripping apparatus 59 identifies based on the current measurement values 55 that a fault is present on the first phase line $L_1$ and subsequently sends a tripping signal 63 to the switch 11. The switch 11 subsequently closes and bypasses the first overvoltage-limiting component 26. The switch 11 can be closed very quickly, for example within 10 milliseconds. The AC voltage circuit breaker between the AC voltage grid 30 and the transformer 5 is not yet (completely) open within this short period of time, with the result that energy continues to flow from the AC voltage grid 30 into the transformer 5. However, since the star point 23 is connected directly to ground potential 17 due to the closure of the switch 11, the electrical potential of the star point 23 is set and the potential of the star point 23 cannot assume undesirably high values. This prevents the device that is connected to the terminals $A_1$ to $A_3$ (in this case: the multilevel power converter) from being damaged due to overvoltage.

Although the overvoltage limitation device 8 likewise serves to limit overvoltages of the star point 23, such overvoltage limitation devices 8 (in particular overvoltage limitation devices with surge arresters) usually react only in the case of a very high overvoltage at the star point 23 that is far above the normal operating voltage. Such overvoltage limitation devices with surge arresters therefore cannot effectively be used to reduce the mentioned overvoltages caused by faults, which is relevant for the sizing of the electrical device. However, the overvoltage limitation device 8 (in this case: the first surge arrester 26) is advantageously short-circuited by means of the switch 11, with the result that the overvoltage-limiting effect can arise much earlier, that is to say much earlier than the surge arrester 26 would react. To this end, only a rapidly tripping switch 11 including a rapidly reacting tripping apparatus 59 is required.

When the fault is identified, the fault-induced shift in the star point voltage at the star point 23 with respect to ground potential is thus reduced or temporally significantly shortened by means of the switch 11. As a result, overvoltages at the terminals $A_1$ to $A_3$ or devices connected to said terminals are effectively reduced or temporally limited. With the aid of the rapid switch 11, a solution has thus been found with which, in particular in the case of connected multilevel power converters, the maximally occurring overvoltage is limited, with the result that a smaller number of modules is sufficient. This leads to a significant cost saving.

Figure 2:
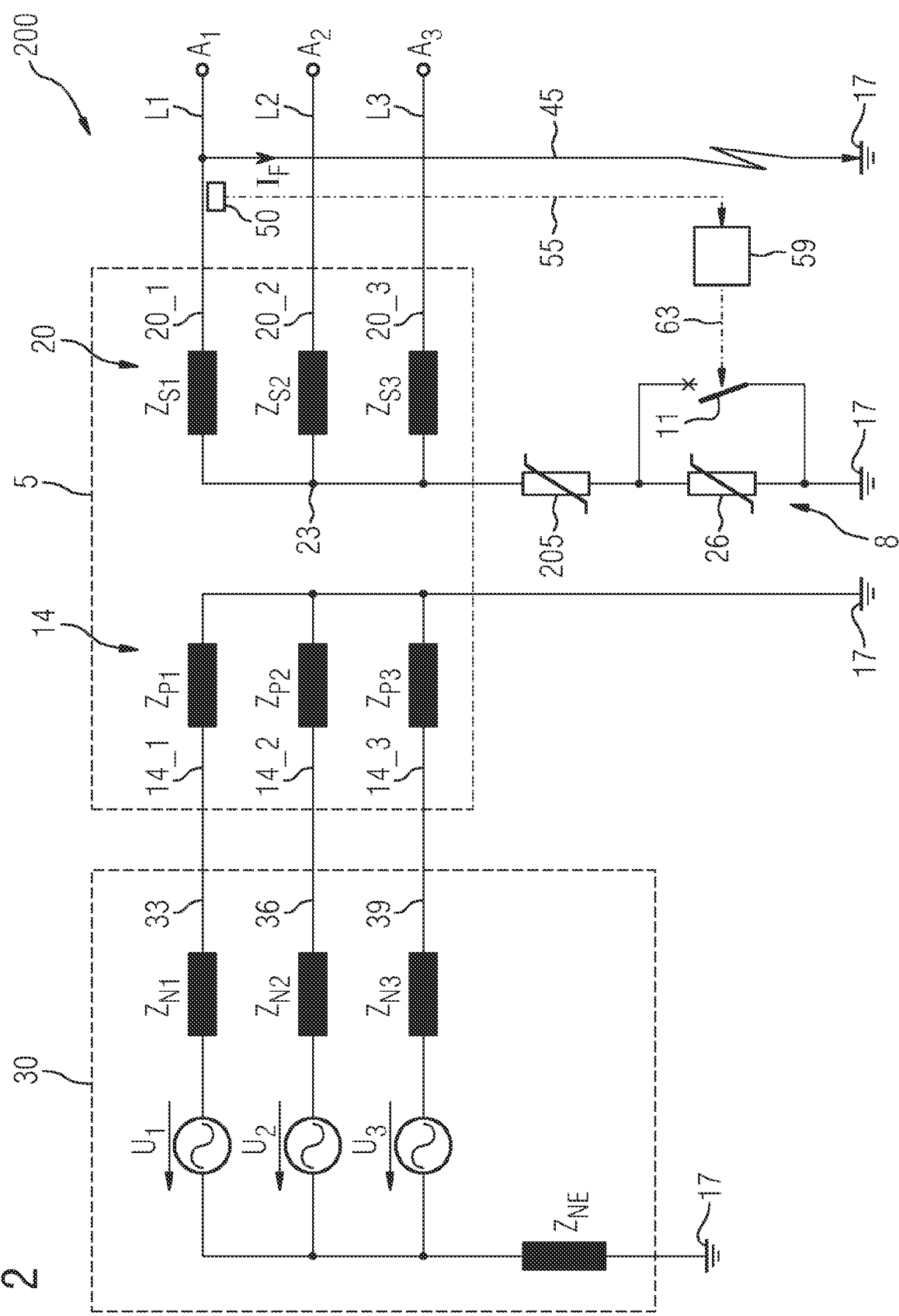
FIG. 2 illustrates an exemplary embodiment of an arrangement having a first and a second overvoltage-limiting component.

FIG. 2 illustrates a further exemplary embodiment of an arrangement 200. This arrangement 200 differs from the arrangement 1 in FIG. 1 only in that the overvoltage limitation device 8 has a second overvoltage-limiting component 205 in addition to the first overvoltage-limiting component 26. Said second overvoltage-limiting component 205 is configured as a second surge arrester 205. The first overvoltage-limiting component 26 and the second overvoltage-limiting component 205 are electrically connected in series. This series circuit connects the star point 23 to ground potential 17.

In the event of a fault, only the first overvoltage-limiting component 26 is short-circuited (bypassed) by means of the switch 11 (short-circuiting device 11); the second overvoltage-limiting component 205 is not influenced by the switch 11. In the event of a fault, the switch 11 thus short-circuits only a part of the overvoltage limitation device 8. As a result, the second overvoltage-limiting component 205 remains electrically active even when the switch 11 is closed. Although this results, even in the event of a fault, in the electrical potential of the star point 23 being reduced when the switch 11 is closed (that is to say the potential of the star point 23 is shifted in the direction of ground potential 17), the electrical potential of the star point 23 is not set to ground potential 17. Instead, an electrical potential greater than ground potential can be produced at the star point 23. This can be advantageous, for example, in limiting the current and voltage fluctuations arising in the event of a fault. Otherwise, the processes in the arrangement 200 proceed as is described in connection with the arrangement 1 according to FIG. 1.

The second overvoltage-limiting component 205 is referred to here as a switchless voltage-limiting component 205 because there is no (bypass) switch assigned to said second overvoltage-limiting component 205.

In the exemplary embodiments of FIGS. 1 and 2, the switch 11 is configured as a mechanical switch. Said mechanical switch can have, for example, a vacuum interrupter. Said vacuum interrupter serves as an insulation device or switching device. Said vacuum interrupter can be closed very quickly, in particular by means of a rapid drive. It is conceivable, for example, for the drive of the vacuum interrupter to be configured as an axial linear drive. In FIGS. 1 and 2, the switch 11 is illustrated as a circuit breaker. However, the switch 11 does not have to be a circuit breaker; the illustration is to be understood as purely exemplary.

Figure 3:
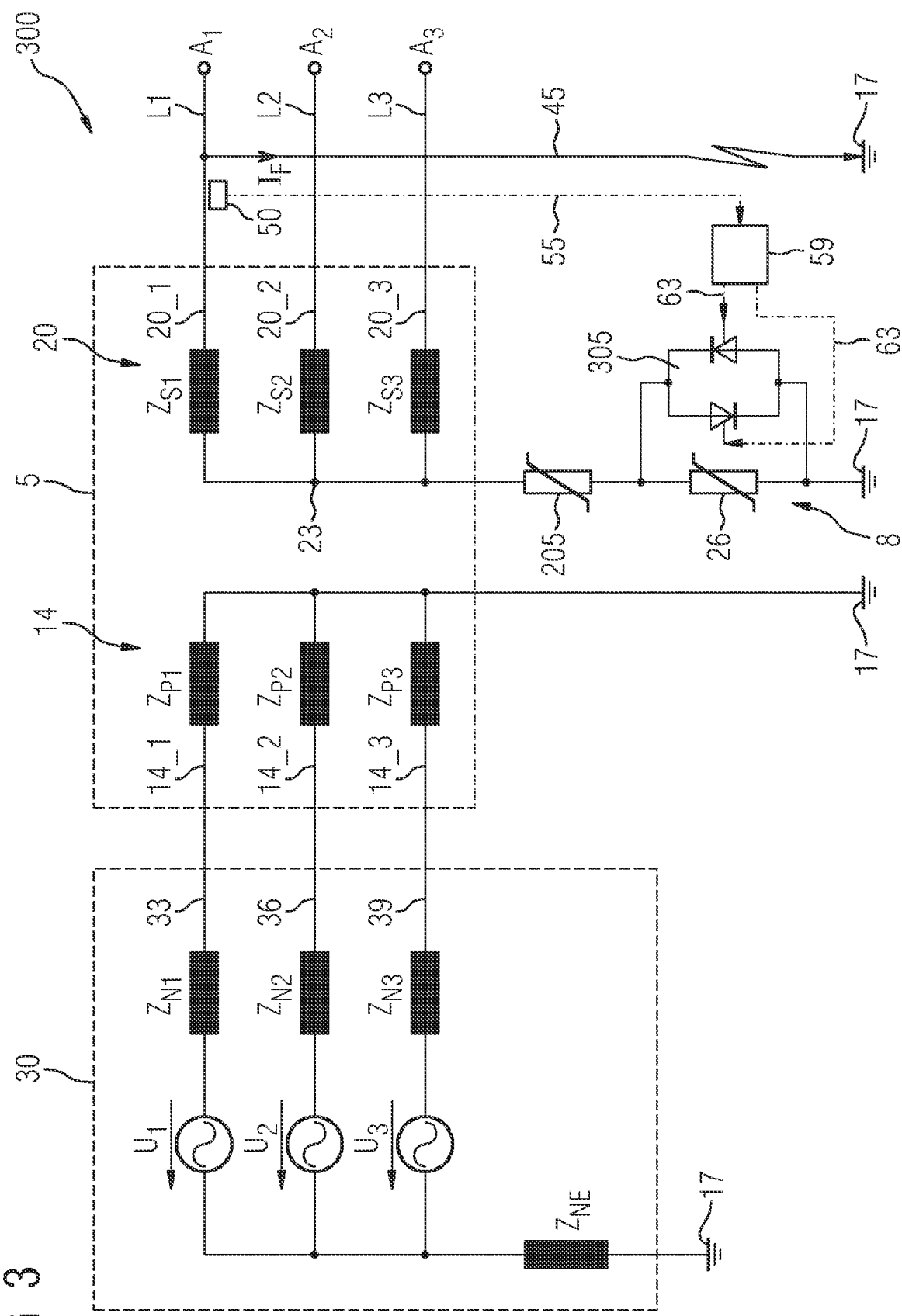
FIG. 3 illustrates an exemplary embodiment of an arrangement having a thyristor switch.

FIG. 3 illustrates a further exemplary embodiment of an arrangement 300. Said arrangement 300 differs from the exemplary embodiment of FIG. 2 in that the switch is configured as a power electronics switch 305. In the exemplary embodiment, the power electronics switch 305 is a thyristor switch 305 (thyristor short-circuiting device 305). Said switch 305 has thyristors that are connected in anti-parallel and which can direct the current in both directions in their switched-on state. As a result, the first overvoltage-limiting component 26 can be bypassed in the event of a fault by means of the power electronics switch 305. Such a power electronics switch 305 can of course also be used in the arrangement 1 according to FIG. 1.

The switch 11 or 305 can also be configured in a different manner, for example as a (triggerable, that is to say switch-on) gas insulation section.

Figure 4:
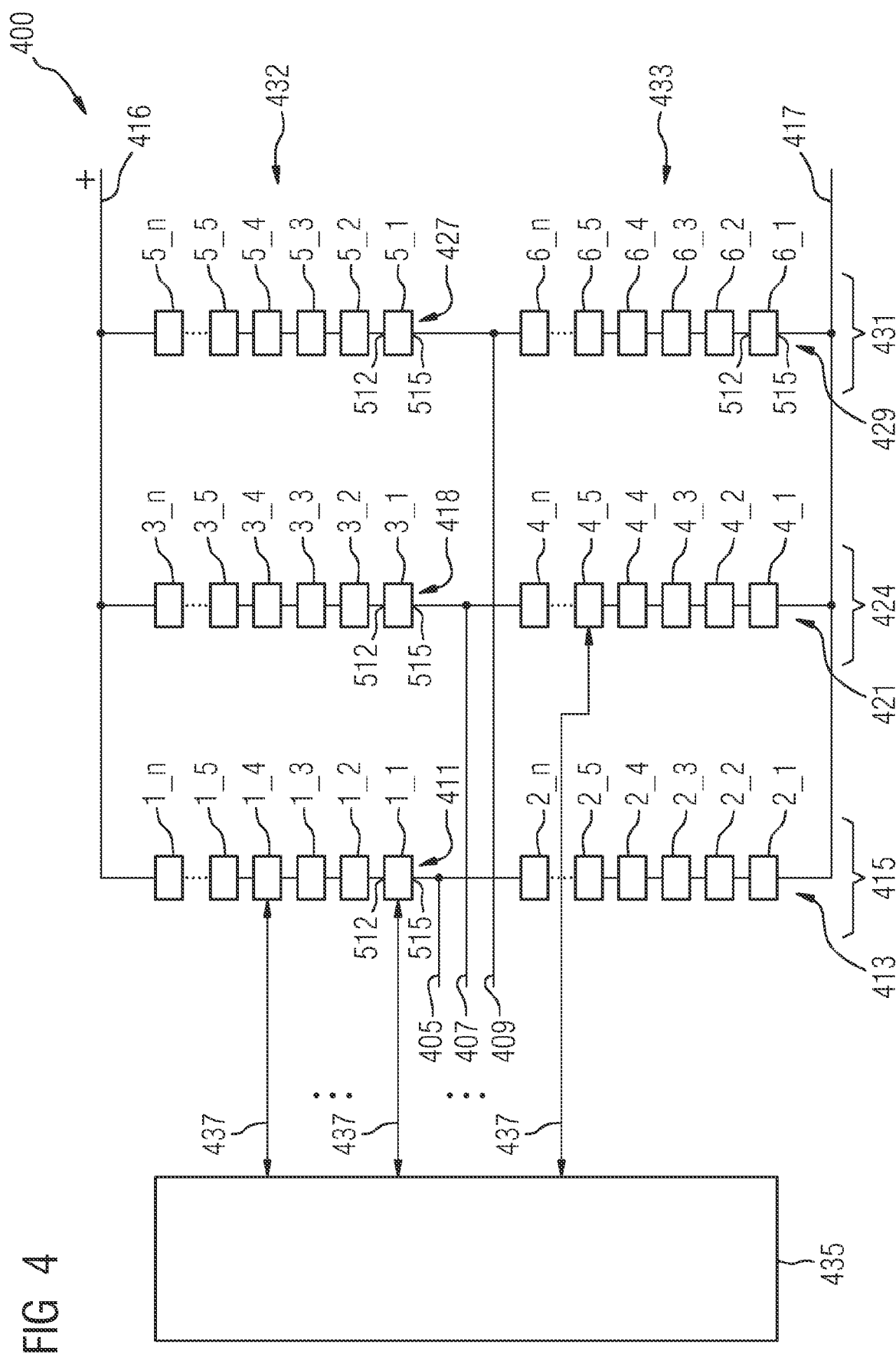
FIG. 4 illustrates an exemplary embodiment of a power converter in the form of a modular multilevel power converter.

FIG. 4 illustrates an exemplary embodiment of a power converter 400. In the exemplary embodiment, said power converter is a modular multilevel power converter 400. Said multilevel power converter 400 can be connected to the terminals $A_1$ to $A_3$ of the arrangement according to FIGS. 1 to 3. The multilevel power converter 400 has a first AC voltage terminal 405, a second AC voltage terminal 407 and a third AC voltage terminal 409. The first AC voltage terminal 405 is electrically connected to a first phase module branch 411 and a second phase module branch 413. The first phase module branch 411 and the second phase module branch 413 form a first phase module 415 of the power converter 400. The end of the first phase module branch 411 that is directed away from the first AC voltage terminal 405 is electrically connected to a first DC voltage terminal 416; the end of the second phase module branch 413 that is directed away from the first AC voltage terminal 405 is electrically connected to a second DC voltage terminal 417. The first DC voltage terminal 416 is a positive DC voltage terminal; the second DC voltage terminal 417 is a negative DC voltage terminal.

The second AC voltage terminal 407 is electrically connected to one end of a third phase module branch 418 and to one end of a fourth phase model branch 421. The third phase module branch 418 and the fourth phase module branch 421 form a second phase module 424. The third AC voltage terminal 409 is electrically connected to one end of a fifth phase module branch 427 and to one end of a sixth phase module branch 429. The fifth phase module branch 427 and the sixth phase model branch 429 form a third phase module 431.

The end of the third phase module branch 418 that is directed away from the second AC voltage terminal 407 and the end of the fifth phase model branch 427 that is directed away from the third AC voltage terminal 409 are electrically connected to the first DC voltage terminal 416. The end of the fourth phase module branch 421 that is directed away from the second AC voltage terminal 407 and the end of the sixth phase module branch 429 that is directed away from the third AC voltage terminal 409 are electrically connected to the second DC voltage terminal 417. The first phase module branch 411, the third phase module branch 418 and the fifth phase module branch 427 form a positive-side power converter section 432; the second phase module branch 413, the fourth phase module branch 421 and the sixth phase module branch 429 form a negative-side power converter section 433.

Each phase module branch has a plurality of modules (1_1, 1_2, 1_3, 1_4, . . . , 1_n; 2_1, . . . , 2_n; etc.), which are electrically connected in series (by means of the module terminals thereof). Such modules are also referred to as submodules. In the exemplary embodiment of FIG. 4, each phase module branch has n modules. The number of modules that are electrically connected in series by means of the module terminals thereof can be very different; at least three modules are connected in series but also 50, 100 or more modules can be electrically connected in series, for example. In the exemplary embodiment, n=36: that is to say the first phase module branch 411 has 36 modules 1_1, 1_2, 1_3, . . . , 1_36. The other phase module branches 413, 418, 421, 427 and 429 are of a similar structure.

The left-hand region of FIG. 4 schematically illustrates a control device 435 for the modules 1_1 to 6_n. Optical messages or optical signals are transmitted from said central control device 435 to the individual modules via an optical communication connection 437 (for example via an optical waveguide). The transmission of messages between the control device and a module is illustrated respectively in a symbolic manner by a line 437; the direction of the transmission of messages is symbolized by the arrow points on the lines 437. This is illustrated on the basis of the example of the modules 1_1, 1_4 and 4_5; messages are sent to the other modules and received by said modules in the same manner. For example, the control device 435 sends to the individual modules in each case one setpoint value for the switching state of the electronic switching elements.

FIG. 5 illustrates an exemplary embodiment of a module 500 of the multilevel power converter 400. The module may be, for example, one of the modules 1_1, ..., 6_n illustrated in FIG. 4.

The module 500 is configured as a half-bridge module 500. The module 500 has a first (disconnectable) electronic switching element 502 (first disconnectable semiconductor valve 502) having a first diode 504 that is connected in antiparallel. The module 500 also has a second (disconnectable) electronic switching element 506 (second disconnectable semiconductor valve 506) having a second diode 508 that is connected in antiparallel and an electrical energy store 510 in the form of a capacitor 510. The first electronic switching element 502 and the second electronic switching element 506 are each configured by way of example as an IGBT (insulated-gate bipolar transistor). The first electronic switching element 502 is electrically connected in series with the second electronic switching element 506. A first galvanic module terminal 512 is arranged at the connecting point between the two electronic switching elements 502 and 506. A second galvanic module terminal 515 is arranged at the terminal of the second electronic switching element 506, said terminal being located opposite the connecting point. The second module terminal 515 is also electrically connected to a first terminal of the energy store 510; a second terminal of the energy store 510 is electrically connected to the terminal of the first electronic switching element 502, said terminal being located opposite the connecting point.

The energy store 510 is thus electrically connected in parallel with the series circuit composed of the first electronic switching element 502 and the second electronic switching element 506. By correspondingly actuating the first electronic switching element 502 and the second electronic switching element 506 by way of a control device of the power converter, it is possible to achieve a situation in which either the voltage of the energy store 510 is output or no voltage is output (that is to say a zero voltage is output) between the first module terminal 512 and the second module terminal 515. It is thus possible to produce the respectively desired output voltage of the power converter through interaction of the modules of the individual phase module branches.

FIG. 6 illustrates a further exemplary embodiment of a module 600 of the multilevel power converter 400. The module 600 may be, for example, one of the modules 1_1, ..., 6_n illustrated in FIG. 4.

In addition to the first electronic switching element 502, second electronic switching element 506, first freewheeling diode 504, second freewheeling diode 508 and energy store 510 already known from FIG. 5, the module 600 illustrated in FIG. 6 has a third electronic switching element 602 having a third freewheeling diode 604 that is connected in antiparallel and also a fourth electronic switching element 606 having a fourth freewheeling diode 608 that is connected in antiparallel. The third electronic switching element 602 and the fourth electronic switching element 606 are each configured, by way of example, as an IGBT. In contrast to the circuit of FIG. 5, the second module terminal 615 is not electrically connected to the second electronic switching element 506, but instead to a center point (connecting point) of an electrical series circuit composed of the third electronic switching element 602 and the fourth electronic switching element 606.

The module 600 of FIG. 6 is what is known as a full-bridge module 600. Said full-bridge module 600 is characterized in that selectively either the positive voltage of the energy store 510, the negative voltage of the energy store 510 or a voltage of the value zero (zero voltage) can be output upon appropriate actuation of the four electronic switching elements between the first (galvanic) module terminal 512 and the second (galvanic) module terminal 615. Therefore, the polarity of the output voltage can thus be reversed by means of the full-bridge module 600. The multilevel power converter 400 can have either only half-bridge modules 500, only full-bridge modules 600 or else half-bridge modules 500 and full-bridge modules 600.

As already explained above, in particular upon the occurrence of a single-pole ground fault between the transformer 5 and the multilevel power converter 400, there is the risk of the AC voltage occurring at the AC voltage terminals 405, 407 and 409 assuming very high values. The modules can be overloaded thereby, that is to say the energy stores 510 of the modules can be charged to an impermissibly high voltage. Such undesired charging of the modules of the multilevel power converter 400 is prevented or at least reduced by means of the switch 11 (which in the event of a fault partly or completely bypasses the overvoltage limitation device 8). As a result, reliable protection from overvoltage is achieved. As a result, overvoltage-induced oversizing of the number of modules in the multilevel power converter is no longer necessary, which leads to a considerable cost saving.

An arrangement and a method have been described, by way of which, when a fault occurs, an overvoltage, which can occur on the secondary windings of the transformer that are connected in a star circuit, can be limited or completely prevented. As a result, a device that is connected to the transformer, for example a multilevel power converter that is connected to the transformer, is effectively protected from overvoltage.

In particular, in the event of a single-pole ground fault on the power converter side the switch is used in order to prevent an asymmetrical voltage increase in the three-phase AC voltage (and thus undesired charging of the modules of the multilevel power converter to excessively high voltages). By closing the switch, a fault-induced shift in the star point voltage with respect to ground potential is temporally shortened after identification of such a fault. In this case, it is advantageous when the entire reaction time and switching time of the tripping apparatus 59 and of the switch is shorter than 10 milliseconds.

The use of the switch is advantageous, in particular, in transformers that have a secondary voltage greater than or equal to 36 kV.

The switch 11 or 305 is thus used for (predominantly occasional) star point grounding. The switch makes possible complete star point grounding (as illustrated in FIG. 1) or partial star point grounding (as illustrated in FIG. 2). This star point grounding reduces or temporally shortens an asymmetrical potential increase in the event of asymmetrical faults. In the case of switching times <10 milliseconds, the modules of the multilevel power converter can be protected particularly effectively. Furthermore, it is advantageous when no contact bounce (or only low contact bounce) occurs in the switch 11 in order to prevent severe loading of the switch 11. This is advantageous, for example, when using vacuum interrupters as insulation device or switching device.

The transformer 5 may in principle be any desired transformer. The transformer 5 can thus have, for example, a single core for each phase (single-phase core), or else a core associated with all three phases (three-phase core). The grid-side windings (primary windings 14) can have any desired vector group (for example star circuit or delta circuit). That is to say said primary windings 14 do not have to be arranged in a star circuit as in the exemplary embodiment. The transformer can also have further winding systems; these do not impair the effect of the star-point-side short-circuiting device 11 on the secondary windings 20.

The invention claimed is:

1. A configuration, comprising:
   an overvoltage limitation device having a first overvoltage-limiting component and a second overvoltage-limiting component which is electrically connected in series with said first overvoltage-limiting component;
   a polyphase transformer having primary windings and secondary windings, wherein said secondary windings are connected in a star circuit having a star point, said star point being connected to a ground potential by means of said overvoltage limitation device; and
   a switch being assigned to the first overvoltage-limiting component, said switch in its closed state electrically bypassing said first overvoltage-limiting component, said switch including at least one of a mechanical switch including a vacuum interrupter or a triggerable gas insulation section.

2. The configuration according to claim 1, wherein said switch is connected in parallel with said first overvoltage-limiting component.

3. The configuration according to claim 1, wherein said second overvoltage-limiting component is switchless.

4. The configuration according to claim 1, wherein said first overvoltage-limiting component and/or said second overvoltage-limiting component form a surge arrester.

5. The configuration according to claim 1, wherein said switch is a mechanical switch.

6. The configuration according to claim 5, wherein said mechanical switch is a vacuum interrupter.

7. The configuration according to claim 1, wherein said switch is a power electronics switch.

8. The configuration according to claim 1, wherein said switch has a gas section.

9. The configuration according to claim 1, further comprising a tripping apparatus connected to said switch, said tripping apparatus is configured in such a way that it closes said switch when a fault occurs on said secondary side of said polyphase transformer.

10. The configuration according to claim 9, further comprising a power converter connected to said secondary side of said polyphase transformer, said tripping apparatus is configured in such a way that it closes said switch when a fault occurs in said power converter.

11. The configuration according to claim 1, wherein said polyphase transformer is configured for a secondary voltage≥36 kV.

12. The configuration according to claim 1, wherein said switch is a power electronics switch having thyristors that are connected in antiparallel.

13. A method for protecting an electrical system from an overvoltage, wherein the electrical system containing a polyphase transformer having primary windings and secondary windings, the secondary windings are connected in a star circuit having a star point, the star point being connected to a ground potential by means of an overvoltage limitation device, the overvoltage limitation device including a first overvoltage-limiting component and a second overvoltage-limiting component which is electrically connected in series with the first overvoltage-limiting component, the electrical system further having a switch being assigned to the first overvoltage-limiting component, the switch in its closed state electrically bypasses the first overvoltage-limiting component, the switch including at least one of a mechanical switch including a vacuum interrupter or a triggerable gas insulation section, which method comprises the step of:
   closing the switch when a fault occurs on the secondary side of the transformer, wherein the fault is a ground fault on a phase line that is connected to one of the secondary windings of the polyphase transformer.

14. The method according to claim 13, wherein the fault is a fault that occurs in a power converter that is connected to the secondary side of the transformer.

15. A configuration, comprising:
   an overvoltage limitation device having a first overvoltage-limiting component and a second overvoltage-limiting component which is electrically connected in series with said first overvoltage-limiting component;
   a polyphase transformer having primary windings and secondary windings, wherein said secondary windings are connected in a star circuit having a star point, said star point being connected to a ground potential by means of said overvoltage limitation device;
   a switch being assigned to the first overvoltage-limiting component, said switch in its closed state electrically bypassing said first overvoltage-limiting component, said switch including at least one of a mechanical switch including a vacuum interrupter or a triggerable gas insulation section;
   a measurement transducer arranged on a phase line of said polyphase transformer; and
   a tripping apparatus configured to identify a fault is present on said phase line based on a signal from said measurement transducer arranged on said phase line and subsequently send a tripping signal to said switch to close said switch.

* * * * *